United States Patent
Tyler

(10) Patent No.: US 7,011,375 B1
(45) Date of Patent: Mar. 14, 2006

(54) APPARATUS AND METHOD TO ASSIST SEAT BELT ENGAGEMENT

(76) Inventor: Paul E. Tyler, 1964 Glatt, Arnold, MO (US) 63010

( * ) Notice: Subject to any disclaimer, the term of this patent is extended or adjusted under 35 U.S.C. 154(b) by 0 days.

(21) Appl. No.: 10/929,325

(22) Filed: Aug. 30, 2004

(51) Int. Cl.
*B60N 3/02* (2006.01)
*B60R 21/00* (2006.01)
*A62B 35/00* (2006.01)

(52) U.S. Cl. .................. 297/482; 297/468; 297/463.1; 297/463.2

(58) Field of Classification Search ................ 297/468, 297/482, 463.1, 463.2
See application file for complete search history.

(56) References Cited

U.S. PATENT DOCUMENTS

| | | | |
|---|---|---|---|
| 4,312,539 A | 1/1982 | Takada | |
| 4,600,217 A | 7/1986 | Naumann et al. | |
| 4,944,557 A | 7/1990 | Tsubai | |
| 5,197,176 A | 3/1993 | Reese | |
| 5,444,907 A * | 8/1995 | Becker | .......................... 29/764 |
| 5,496,083 A * | 3/1996 | Shouse, Jr. | ................... 294/1.1 |
| 5,620,231 A * | 4/1997 | Marker et al. | ....... 297/463.2 X |
| 5,954,397 A | 9/1999 | Czernakowski et al. | |
| 6,634,064 B1 | 10/2003 | Finotti | |
| 2004/0080203 A1 * | 4/2004 | Maloul | ..................... 297/463.1 |
| 2005/0017567 A1 * | 1/2005 | Sachs et al. | ................ 297/468 |

* cited by examiner

*Primary Examiner*—Rodney B. White
(74) *Attorney, Agent, or Firm*—Polster, Lieder, Woodruff & Lucchesi, L.C.

(57) ABSTRACT

The present invention relates to a seat belt assist handle mounted to a component of a seat belt passenger restraint system. A grab handle on the seat belt assist handle allows occupants to grab a component of the seat belt passenger restraint system to allow the occupant to engage that system without engaging in uncomfortable body movements. The configuration of the present invention also provides a signal to an occupant when the occupant has failed to engage the seat belt passenger restraint system.

23 Claims, 2 Drawing Sheets

APPARATUS AND METHOD TO ASSIST SEAT BELT ENGAGEMENT

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

There can be no question that the use of seat belts in automobiles can prevent serious injury and even death to occupants during automobile accidents. In fact, virtually every automobile in the United States is equipped with some form of passive restraint system that uses a seat belt of some kind. However, it is not enough to simply equip passenger automobiles with such systems, the passengers must actually use the system before any safety benefits can be realized.

To motivate usage of seat belt systems, many States have passed seat belt laws requiring drivers and passengers to use seat belts. Failure to do so usually results in fines and penalties to the driver. While this has encouraged somewhat greater use of seat belts, there is still room for improvement. Thus, a device that acts to further encourage more widespread use of seat belts would be useful.

BRIEF DESCRIPTION OF THE SEVERAL VIEWS OF THE DRAWINGS

In the drawings, wherein like numerals and letters refer to like parts wherever they occur.

Corresponding reference characters indicate corresponding parts throughout the several views of the drawings.

While one embodiment of the present invention is illustrated in the above referenced drawings and in the following description, it is understood that the embodiment shown is merely for purpose of illustration and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION

Figure 1:
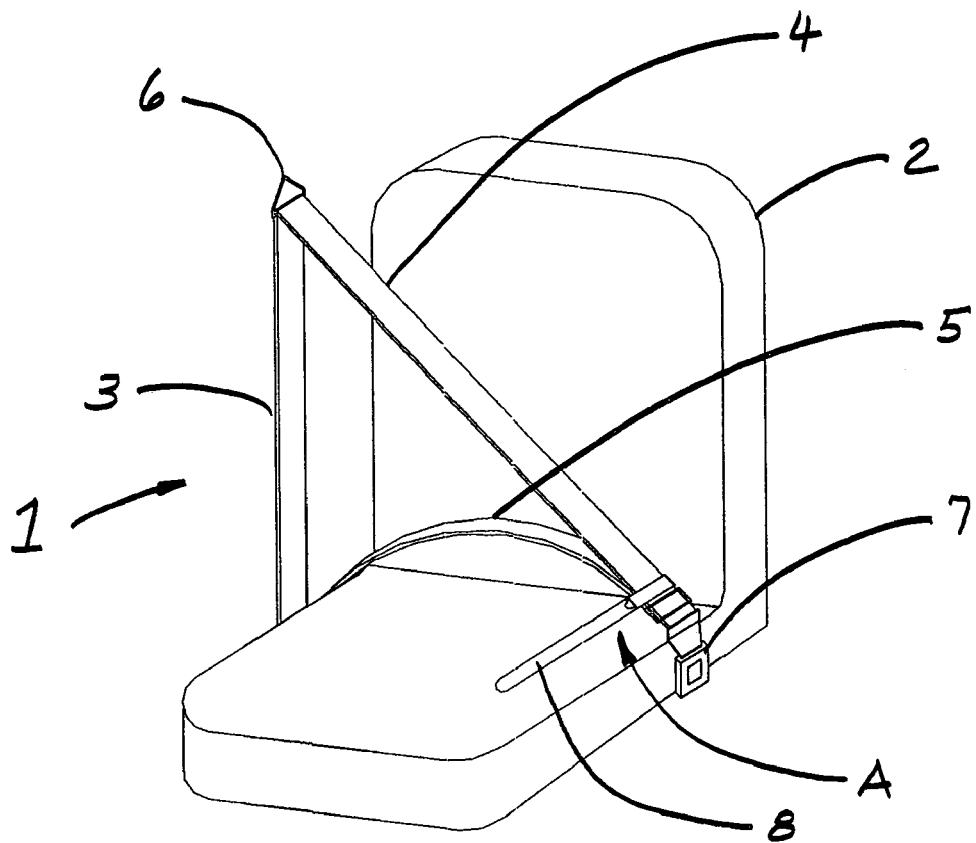
FIG. 1 is a perspective view of a standard passenger's seat in an automotive vehicle having a buckled seat belt and includes one embodiment of the present invention.

Referring now to FIG. 1, a handle for assisting seat belt engagement (hereinafter "assist handle") A is shown. A seat belt restraint system 1 is located near a seat 2 of an automotive vehicle (not shown). The seat belt restraint system 1 includes a vertical harness section 3, a transverse harness section 4, a lap belt section 5, a support clip 6, and a buckle 7. The assist handle A is shown attached to the transverse harness section 4 near the buckle 7. The assist handle A has a grab handle 8 that extends away from the transverse harness section 4. It is understood that FIG. 1 shows the seat belt restraint system 1 as it appears when the seat belt restraint system has been assembled such as to restrain a passenger (not shown) between the seat belt restraint system 1 and the seat 2. It is also understood that while the present embodiment shows the assist handle A attached to the transverse section 4 of the seat belt system 1, the assist handle A may be attached to any section of the automotive seat belt system 1 as long as the point of attachment can assist the user of the seat belt system 1 in using the seat belt.

Figure 2:
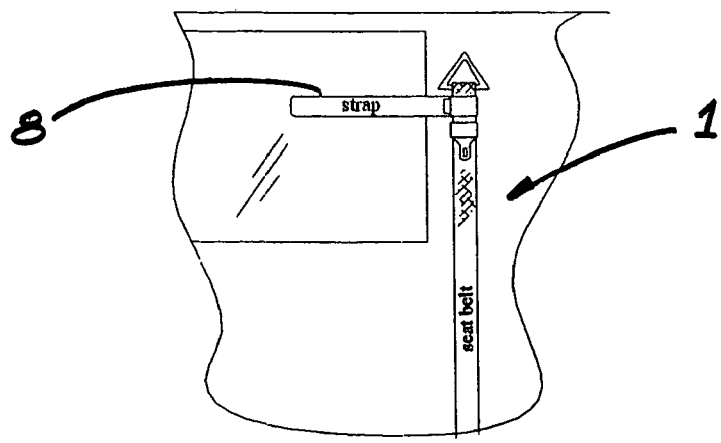
FIG. 2 is an elevation of the passenger's side seat belt in an automotive vehicle showing an unbuckled seat belt that displays one embodiment of the present invention.

FIG. 2 shows the seat belt restraint system 1 in its unengaged state. That is, the transverse section 4 has been disengaged from the buckle 7 and an automatic seat belt retraction system has acted to retract the transverse section 4 of the seat belt system 1 away from the buckle 7. The assist handle A is shown mounted to the transverse section 4 of the seat belt restraint system 1 such that the grab handle 8 is positioned horizontally.

Figure 3:
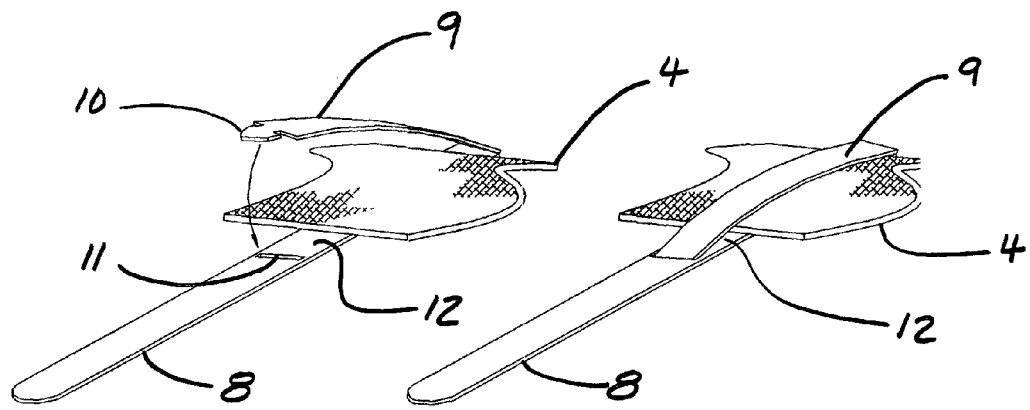
FIG. 3 is a perspective view showing how one embodiment of the present invention is attached to a standard automobile seat belt.

FIG. 3 shows how the assist handle A looks before attachment to the transverse section 4. Specifically, the assist handle A includes a retention component 20 and the grab handle 8. The retention component 20 includes a retaining portion 9, a tab 10, a slot 11, and an upper surface 12. The tab 10 and the slot 11 are sized, designed, and located to lockingly engage the tab 10 with the slot 11 such that the retaining portion 9 is generally aligned with the upper surface 12. In the present embodiment, the upper surface 12 includes a score line 13 that facilitates folding of the retaining portion 9 over the upper surface 12 so that the tab 10 can be inserted into the slot 11. It will be appreciated that various other methods may be used to allow the assist handle A to be attached to the seat belt system 1. For example, the retaining portion 9 may a separate part not integral with the grab handle 8 portion of the assist handle A such that the retaining portion may be attached to the assist handle A by other means. Additionally, other means such as snaps, hook and loop devices, screws, adhesives, hooks, or adhesive tapes may be used to attach the retaining portion 9 to the upper surface 12. Additionally, the assist handle A may also be mounted to the transverse section 4 before finally assembly of the seat belt system 1, and in that case, the retaining portion 9 of the assist handle A can be molded to the upper surface 12.

Figure 4:
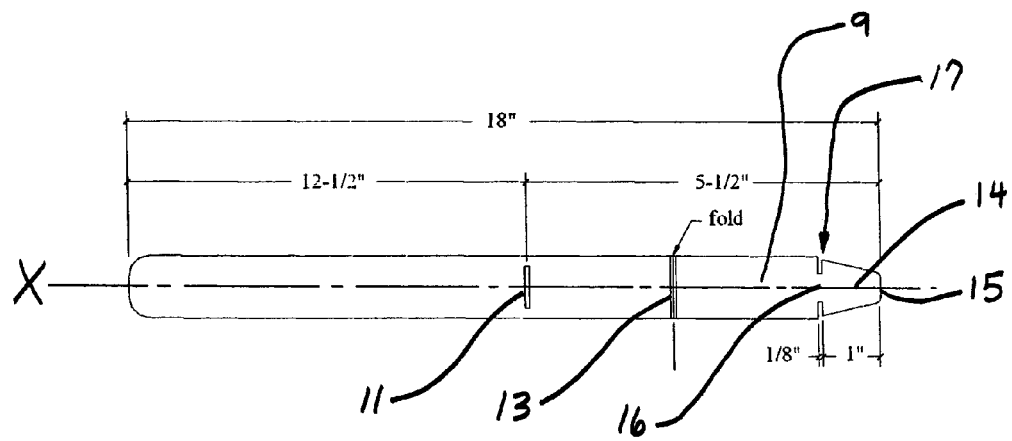
FIG. 4 is a top view of one embodiment of the present invention showing the invention in an uninstalled state.

In the present embodiment, the assist handle A is attached to the transverse section 4. As shown in FIG. 4, the assist handle A is mounted to the transverse section 4 by folding a retaining portion 9 of the assist handle A and engaging a tab 10 into a slot 11 located in the assist handle A. As the tab 10 is inserted into the slot 11, the transverse section 4 of the seat belt system 1 is captivated between the retaining portion 9 and the upper surface 12 of the assist handle A.

Referring again to FIG. 3, the overall length of the assist handle A when in its uninstalled, flat configuration is about 18.0 inches in length. The tab 10 of the present embodiment includes a generally triangular section 14 on a first end 15 of the retaining portion 9 of the assist handle A. The first end 15 of the triangular section 14 is rounded and the base 16 of the triangular section includes two notches 17. The two notches 17 act to secure the engagement of the retaining portion 9 into the upper surface 12 when the tab 10 is inserted into the slot 11. The tab 10 may be between about 2.0 inches and 0.5 inches in length as shown in FIG. 3. In the present embodiment, the tab 10 is about 1.0 inch in length. The two notches 17 are about 0.12 inch in width and about 0.25 inch in depth. The slot 11 is located on the longitudinal axis X of the assist handle A at a distance of about 5.5 inches from the first end 15.

A fold line 13 is located at about 5.5 inches from the first end 15. It is appreciated that the location of the fold line 13 may be adjusted to fit the size of the seat belts in the seat belt restraint system 1 with which the assist handle A is used. In the present embodiment the fold line 13 is a score line that is perpendicular to the longitudinal axis X of the assist handle A and extends across the width of the upper surface 12. The fold line 13 acts to enable the retaining portion 9 to be folded onto the upper surface 12 without the retaining portion 9 bowing generally outward.

The grab handle 8 of the assist handle A is about 12.5 inches in length. It is appreciated, however, that the length of the grab handle 8 may be modified as needed to fit the specific application and use of the assist handle A. Thus, it is understood that the grab handle 8 may have a length of between about 24.0 inches to about 3.0 inches and still remain within the scope of the present invention. The width of the assist handle A is between about 0.5 inch and about 3.0 inches. In the present embodiment, the width of the assist handle A is about 1.0 inch.

The assist handle A of the present embodiment is made from a plastic material such as polyethylene. However, in other embodiments, any material may be used so long as the material selected allows the assist handle A to be attached to the seat belt as described herein.

In operation, the assist handle A acts to perform at least two functions. First, the assist handle 8 provides a means for passengers to reach the seat belt system 1 so that the seat belts can be engaged. This situation occurs when a person having certain physical disabilities finds it difficult or even impossible to reach across their shoulder to grab the retracted seat belt. For example, a passenger would normally have to extend a left arm across the chest in order to reach the retracted seat belt system 1 located to the right and behind the passenger. Without the assist handle A, the disabled passenger would have difficulty in reaching across the chest to grab the retracted seat belt system 1. However, when the assist handle A is installed on the seat belt system 1, the grab handle 8 extends forward toward the front of the vehicle. The extended grab handle 8 thereby allows the disabled occupant to reach the seat belt system 1 without having to contort their body to reach the retracted seat belts.

In the second situation, a non-disabled passenger may sit down in the automobile seat without engaging the seat belt system 1. Because the grab handle 8 faces forward when the seat belt system 1 is retracted as shown in FIG. 2, the grab handle 8 extends into the peripheral vision of the occupant as a signal that the seat belt system 1 has not been engaged. In one embodiment of the present invention, the assist handle A is made from a brightly colored material such as a fluorescent orange, green, or yellow to further enhance the visibility of the signal offered by the grab handle 8 to inform the occupant that the seat belt system 1 has not been engaged. In yet other embodiments of the present invention, the grab handle 8 is also used as a surface upon which other graphics may be placed, including graphics that advertise certain vendor products or services. Thus, the grab handle 8 acts to notify the occupant that the seat belt system 1 should be engaged before the automobile begins its movement, and may also act to notify users of products or services offered by vendors.

While the above description describes various embodiments of the present invention, it will be clear that the present invention may be otherwise easily adapted to fit any configuration where an apparatus to assist engagement of an automobile seat belt is required. As various changes could be made in the above constructions without departing from the scope of the invention, it is intended that all matter contained in the above description or shown in the accompanying drawings shall be interpreted as illustrative and not in a limiting sense.

What is claimed is:

1. A seat belt assist handle adapted to be mounted to a belt of an automotive seat belt passenger restraint system, the seat belt assist handle comprising:

a grab handle having a first end, a second end, and an opening between said grab handle first and second ends; and a retention component having an upper surface, a first end integrally connected to said grab handle second end and a second end having an end member thereat;

said retention component being foldable over said grab handle to engage said retention component end member with said grab handle opening; said retention component end member being configured to lockingly engage with said grab handle opening;

said grab handle opening being spaced from said grab handle second end a distance sufficient, such that, when said retention component end member is engaged in said grab handle slot, said seat belt assist handle will define an opening sufficiently large to slidingly receive said belt.

2. The seat belt assist handle of claim 1 wherein the retention component mounts the seat belt assist handle such that a longitudinal axis of the grab handle is positioned to allow an occupant of an automobile to use the grab handle to assist the engagement of the seat belt passenger restraint system.

3. The seat belt assist handle of claim 2 wherein the retention component attaches the seat belt assist handle such that when the seat belt passenger restraint system is not engaged, the longitudinal axis of the grab handle is horizontal in relation to the occupant of the automobile and the grab handle is visible to the occupant of the automobile.

4. The seat belt assist handle of claim 1 wherein the upper surface includes a score line that facilitates folding of the retaining portion over the upper surface so that the tab can be inserted into the grab handle opening, said score line being at a junction between said grab handle and said retention component.

5. The seat belt assist handle of claim 4 wherein the retention component attaches the seat belt assist handle to a transverse belt of the seat belt passenger restraint system.

6. The seat belt assist handle of claim 5 wherein the overall length of the seat belt assist handle when in its uninstalled, flat configuration is about 18.0 inches in length.

7. A seat belt assist handle mountable to a transverse belt of an automotive seat belt passenger restraint system; the seat belt assist handle comprising a grab handle and a retention component; the grab handle and retention component being formed substantially as a one piece assembly;

the retention component including a retaining portion, a tab, a slot, and an upper surface; a score line on the upper surface between the tab and slot to facilitate folding of the retaining portion over the upper surface so that the tab can be inserted into the slot; the tab being sized, designed, and located to lockingly engage with the slot; the retention component being sufficiently configured and sized to captivate a seat belt from the seat belt passenger restraint system when the tab is engaged with the slot; the tab including a generally triangular section on a first end of the retaining portion.

8. The seat belt assist handle of claim 7 wherein the first end of the triangular section is rounded and the base of the triangular section includes two notches that act to secure the retaining portion into the upper surface when the tab is inserted into the slot.

9. The seat belt assist handle of claim 8 wherein the tab is between about 2.0 inches and 0.5 inches in length.

10. The seat belt assist handle of claim 9 wherein the tab is about 1.0 inch in length.

11. The seat belt assist handle of claim 9 wherein the two notches are about 0.12 inch in width and about 0.25 inch in depth.

12. The seat belt assist handle of claim 11 wherein the slot is located on the longitudinal axis of the seat belt assist handle at a distance of about 5.5 inches from an end of said tab.

13. The seat belt assist handle of claim 12 wherein the fold line is located at about 5.5 inches from the first end and the fold line is approximately mid-way between said notches and said slot.

14. The seat belt assist handle of claim 13 wherein the fold line is a score line that is perpendicular to the longitudinal axis of the seat belt assist handle and the score line extends across the width of the upper surface.

15. The seat belt assist handle of claim 14 wherein the fold line acts to enable the retaining portion to be folded onto the upper surface without the retaining portion bowing generally outward.

16. The seat belt assist handle of claim 15 wherein the grab handle has a length of between about 3.0 inches and about 24.00 inches and the grab handle has a width of between 0.5 inch and about 3.0 inches.

17. The seat belt assist handle of claim 16 wherein the grab handle is about 12.5 inches in length and about 1.5 inches in width.

18. The seat belt assist handle of claim 17 wherein the seat belt assist handle is made from a plastic material.

19. The seat belt assist handle of claim 18 wherein the seat belt assist handle is made from a brightly colored material such as a fluorescent orange, green, or yellow to enhance the visibility of the signal offered by the grab handle to inform the occupant that the seat belt passenger restraint system has not been engaged.

20. The seat belt assist handle of claim 1 wherein said grab handle and retention component are generally co-planar when said seat belt assist handle is laid out in an open position.

21. A seat belt assist handle comprised of a strip of material having a first end, a second end, an opening formed between said first and second ends, and an end formation at said second end; said strip being foldable over itself such that said end formation can engage said opening; said end formation being sized and shaped to lockingly engage said opening; said opening being spaced from said end formation a distance sufficient such that when said end formation is engaged with said opening, said seat belt assist handle defines an opening sized to surround a seat belt of a passenger restraint system.

22. The seat belt assist handle of claim 21 wherein, said strip of material lies substantially in a single plane when said handle is unfolded.

23. The seat belt assist handle of claim 21 comprising a fold line between said opening and said end formation; said fold line facilitating folding said strip of material to engage said end formation with said opening.

* * * * *